July 7, 1953  A. BRUEDER  2,644,905
DEVICE HAVING THE DUAL FUNCTION OF ELECTROMAGNETIC
CLUTCH AND ALTERNATOR
Filed Dec. 4, 1951  3 Sheets-Sheet 1
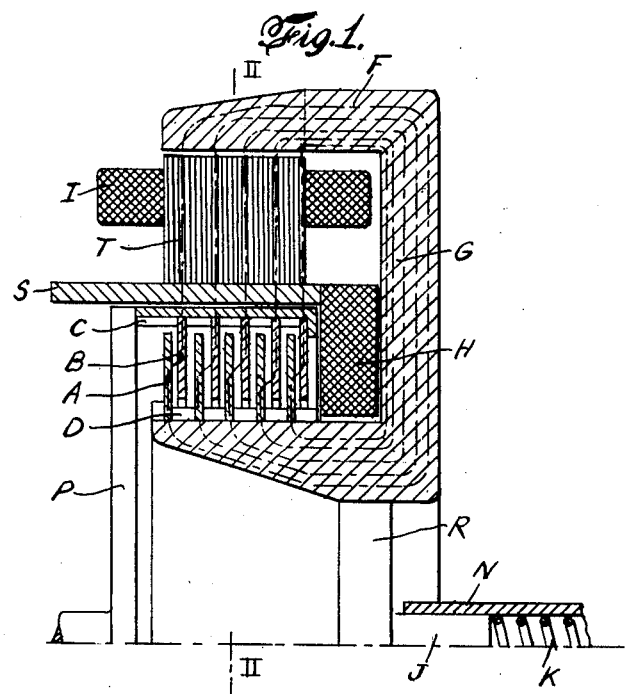
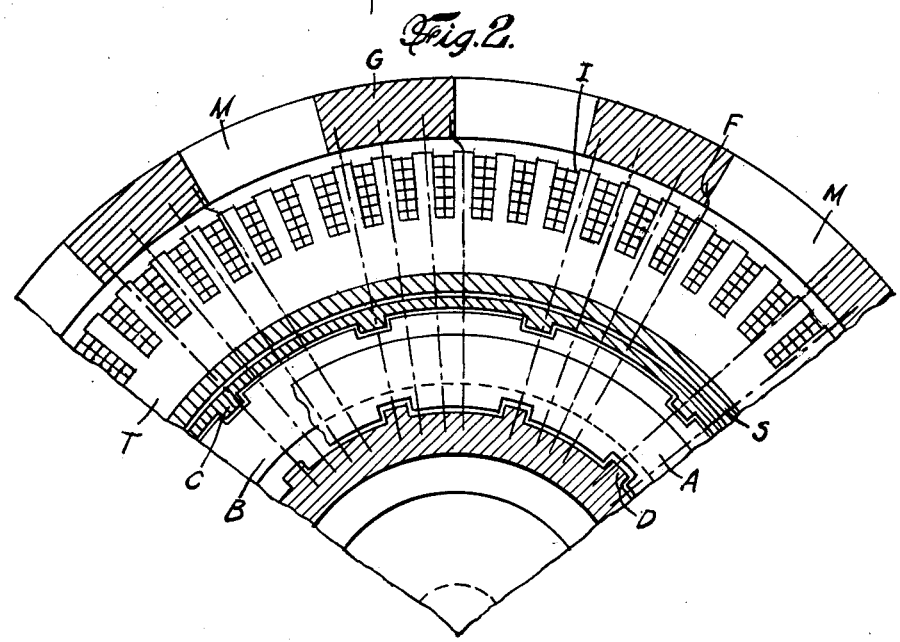
INVENTOR.
ANTOINE BRUEDER
BY
ATTORNEY.

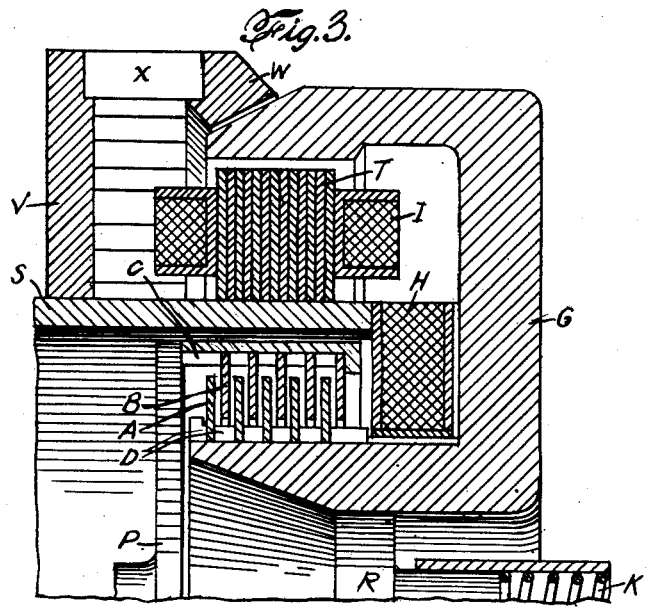
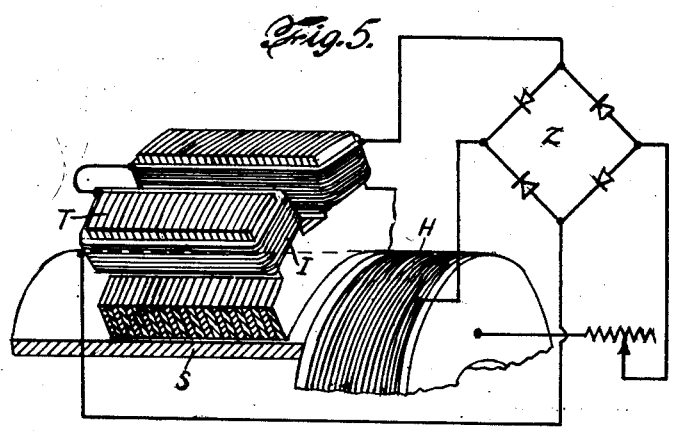

July 7, 1953 A. BRUEDER 2,644,905
DEVICE HAVING THE DUAL FUNCTION OF ELECTROMAGNETIC
CLUTCH AND ALTERNATOR
Filed Dec. 4, 1951 3 Sheets-Sheet 3

INVENTOR.
ANTOINE BRUEDER
BY

ATTORNEY

UNITED STATES PATENT OFFICE 2,644,905

DEVICE HAVING THE DUAL FUNCTION OF ELECTROMAGNETIC CLUTCH AND ALTERNATOR

Antoine Brueder, Paris, France, assignor to Societe Anonyme Andre Citroen, Paris, France Application December 4, 1951, Serial No. 259,840
In France December 4, 1950

2 Claims. (Cl. 310—78)

The invention relates in general to clutches and alternator and more particularly to a device wherein the function of an electromagnetic clutch is combined with that of an alternator.

Electromagnetic clutches are already known which consist of a pair of coaxial plates of which the one has a smaller diameter than the other and is mounted for axial sliding movement in relation thereto, and of two sets of clutch disks so arranged that the disks of one set alternate with those of the other set, these disks being rotatably fixed with opposite rims arranged at right angles to the aforesaid plates; according to a specific embodiment of such electromagnetic clutches one rim is rigid with a magnet frame rigid with the sliding plate and of U-shaped cross-section, the arms of the U being parallel to the clutch axis and enclosing these two sets of disks; in this case, the energizing coil of the electromagnet is carried by the end portion of a fixed iron cylinder located between the rim and the magnet frame.

It is the object of this invention to provide a device acting both as an electromagnetic clutch and as an alternator, characterized in that it comprises, in the gap between the U-shaped magnet frame and a cylinder carrying the fixed energizing coil positioned in the bottom of this magnet frame without however touching it and registering with the two sets of alternate clutch disks of which one set is rotatably rigid with a rim secured to one of the clutch plates and the other with the inside of the U of the magnet frame, soft iron stampings and a winding fixed on this cylinder and constituting the induced electrical element of an alternator the magnetic flux of which is supplied by the energizing coil and by the magnetic circuit of the clutch.

From the very start this device requires a storage battery for supplying current to the energizing coil in order to start the operation of the electromagnet so that the latter will attract the clutch disks and therefore cause the clutch engagement to take place.

In order to dispense with the supply of current from a battery for starting and permitting the application of brakes without stalling the engine on a vehicle on which the device is fitted, I supplement the device according to this invention with a complementary magnetic circuit consisting of magnets for the purpose of "priming" the current supply. At the start the auxiliary alternator consisting of the circuit comprising the auxiliary magnets, the rotary magnet frame, the soft-iron stampings and the winding of the homopolar alternator will first induce current in this winding, thereby increasing the magnetic flux and this progressively increasing current is rectified and flows through the coil of the electromagnet so as to cause the clutch disks to be attracted.

Conversely, when the rotational speed decreases due for example to the application of brakes, the current drops in the alternator winding and therefore in the electromagnet coil, and tends to attain zero value. The magnetic flywheel is idling and does not cause the engine to stall while the clutch disks are released.

The accompanying drawings forming part of this specification illustrate diagrammatically by way of example a preferred embodiment of the invention. In the drawings:

Fig. 1 is a diagrammatical fragmentary axial section of the device.

Fig. 2 is a cross-sectional fragmentary view according to the line II—II of Fig. 1.

Fig. 3 is a fragmentary diametral section of an improved device, and

Fig. 5 is a schematic view showing electrical connections.

Figure 4:
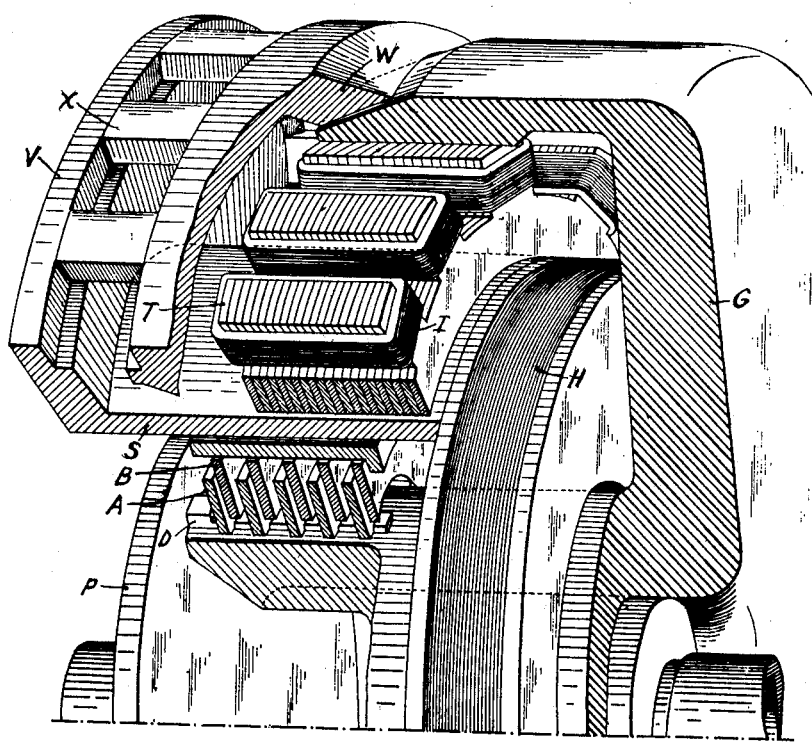
Fig. 4 is a perspective sectional view thereof with parts broken away in order to show constructional details.

The device illustrated in Figs. 1 and 2 comprises a pair of coaxial clutch plates P and R. The plate P is rigid with a grooved rim C carrying a set of metal clutch disks B and the other plate R is rigid with a magnet frame G of U-shaped radial section and carrying on the inner face of the U another set of metal clutch disks A alternating with the disks B. The clutch plate R is mounted for sliding movement relative to the plate P, for example by axially moving its shaft J in a sleeve member N against the pressure of a spring K which tends to release the clutch disks A and B from one another.

The fixed energizing coil H is mounted at the inner end of the cylinder S between the bottom wall of the magnet frame G and the clutch disks A, B.

According to this invention, the outer periphery of the cylinder S carries, inside the U of the magnet frame, soft-iron stampings T and the winding I of a homopolar alternator of conventional design. The circuit of this alternator obviously also comprises the magnet frame or yoke G and the coil H. The external wing of the U is formed with indentations M (Fig. 2) acting as pole pieces.

With the device according to the invention a substantial saving in weight is achieved as compared with known devices of this kind wherein an electromagnetic clutch is combined with an alternator, and this is due to the fact that the magnetic flux that operates the clutch also serves for the alternator, the latter being reduced to its mere armature coils. The magnetic flux circulates invariably in the same direction and its lines of force are shown at F.

According to the improved embodiment of the invention shown in Figs. 3 and 4, in the U-shaped cavity of the flywheel-forming magnet frame are mounted: the fixed electro-magnet coil H, followed (in the outward axial direction) by the two sets of clutch disks A and B rotatably fast with, but axially slidable on, longitudinal splines provided on rims C and D of the rotary plates P and R respectively, the fixed sleeve S, that supports on the one hand the aforesaid coil H and on the other hand the soft-iron stampings T carrying the cooperative windings I, as shown.

On the fixed sleeve S is centered an iron annulus V and an iron ring member W, acting as a pole piece, distance pieces X of magnetic material being mounted in spaced relationship between the annulus V and ring W and constituting the complemental elements of the resulting auxiliary alternator.

The windings I are electrically connected with the magnet coil H through a rectifier Z (Fig. 5).

As the driven member R of the assembly begins to rotate the magnets X will prime the current and the auxiliary alternator consisting of the magnetic flywheel G, annuli V, W, stampings T and the windings I cooperating therewith will cause current to flow through this magnetic flywheel. This rectified current energizes the coil H and the resulting flux circulates through the clutch disks A, B and causes same to be attracted and therefore the clutch engagement.

As the speed of rotation increases the current intensifies the flux in the stampings T and therefore rises in the coil H and may be caused to charge a storage battery.

As the speed of rotation slows down, for example on applying the brakes in the case of a road or other vehicle, the current drops accordingly through I and H and tends to assume a zero value; thus, the clutch disks A, B are released, the engine is allowed to idle and cannot stall.

While I have illustrated and described what may be considered as preferred forms of embodiment of my invention, it will be readily understood by those conversant with the art that many modifications may be brought thereto as to shapes, dimensions and proportions of parts, materials and arrangement of auxiliary parts such as clutch release springs, wirings, etc. without departing however from the spirit and scope of the invention.

What I claim is:

1. Device having the dual function of an electromagnetic clutch and an alternator, comprising an axially slidable clutch plate, a coaxial fixed plate, a magnetic flywheel fast with said fixed plate, formed with a radial U-shaped cavity with the arms of the U parallel with the axis of said flywheel, peripheral notches in the outer arm of said U, a fixed coaxial cylindrical sleeve member, an energizing coil carried by said sleeve member adjacent to the bottom of said U-shaped cavity of said flywheel, an annular rim fast with said fixed plate, a first set of clutch disks mounted for sliding axial movement on the inner side of said annular rim in said flywheel cavity and registering with said energizing coil, another set of clutch disks alternating with the clutch disks of said first set and mounted for sliding axial movement on the outer periphery of the inner arm of said U, and soft-iron stampings with a cooperative winding positioned in the gap between said fixed sleeve and the inner periphery of the outer arm of said U, both said stampings and winding being fixed on said sleeve and registering with said peripheral notches so as to form a homopolar alternator.

2. Device according to claim 1 comprising in addition an iron annulus and a fixed auxiliary alternator consisting of a ring member parallel with said iron annulus secured thereto through peripherally spaced distance-pieces of magnetic material, said annulus, ring member and magnet assembly being mounted on said fixed cylindrical sleeve member.

ANTOINE BRUEDER.

No references cited.